R. P. ESPINOSA.
REPAIR VULCANIZER.
APPLICATION FILED MAR. 25, 1918.
1,280,003.
Patented Sept. 24, 1918.
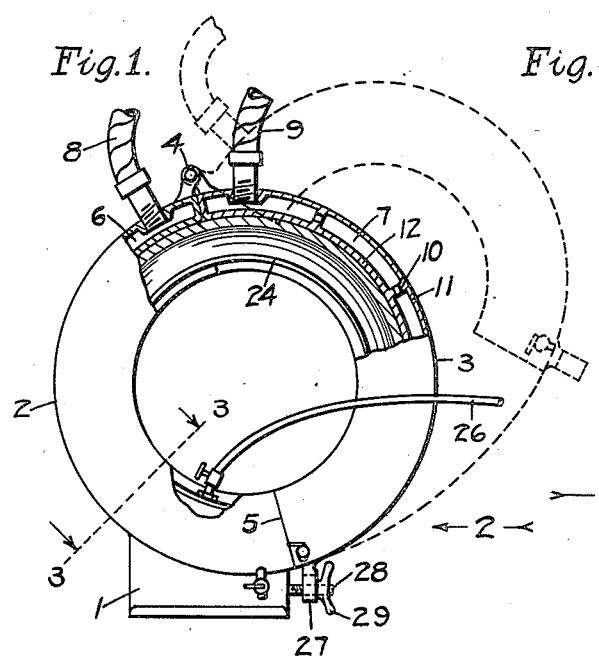
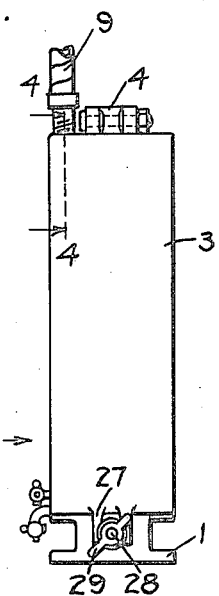
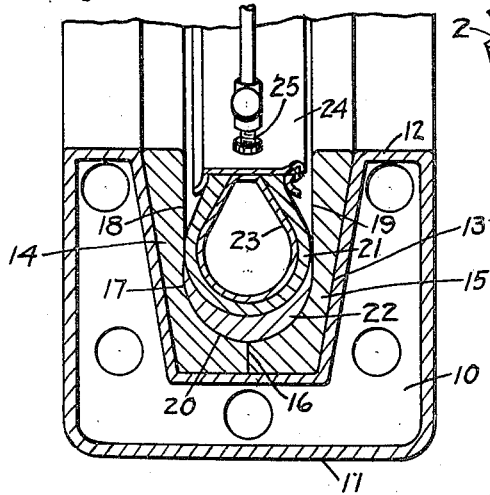
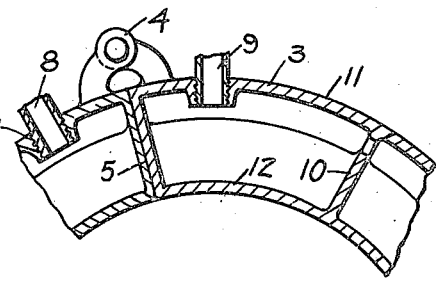
Inventor:
Rudolph P. Espinosa,
by Hazard & Miller
Attys.

UNITED STATES PATENT OFFICE.

RUDOLPH P. ESPINOSA, OF LOS ANGELES, CALIFORNIA.

REPAIR-VULCANIZER.

1,280,003.

Specification of Letters Patent.

Patented Sept. 24, 1918.

Application filed March 25, 1918. Serial No. 224,659.

*To all whom it may concern:*

Be it known that I, RUDOLPH P. ESPINOSA, a citizen of the United States, residing at Los Angeles, in the county of Los Angeles and State of California, have invented new and useful Improvements in Repair-Vulcanizers, of which the following is a specification.

My object is to make an improved repair vulcanizer capable of curing a complete retread at one operation, and my invention consists in the novel features herein shown, described and claimed.

Figure 1 is a front elevation of a repair vulcanizer embodying the principles of my invention, parts being broken away and shown in section, the view being taken looking in the direction indicated by the arrow 1 in Fig. 2.

Fig. 2 is a side elevation looking in the direction indicated by the arrow 2 in Fig. 1.

Fig. 3 is an enlarged cross sectional detail on the line 3—3 of Fig. 1.

Fig. 4 is a fragmentary sectional detail on the line 4—4 of Fig. 2.

The base 1 is adapted to rest upon any suitable foundation and the rigid steam jacket 2 is formed integral with the base 1. A swinging steam jacket 3 is connected to the rigid steam jacket 2 by a hinge 4. The steam jackets 2 and 3 form a circle in front elevation, each of said jackets extending through a half circle and the parting line 5 between the meeting ends of the steam jackets 2 and 3 is slightly inclined relative to a vertical line. The steam jacket 2 is cored to form a steam chamber 6 and the steam jacket 3 is cored to form a steam chamber 7, steam being supplied to the chambers 6 and 7 through flexible pipes or hose 8 and 9. Braces 10 connect the outer walls 11 to the inner walls 12 of the steam jacket 3 and similar braces are provided in the chamber 6 of the steam jacket 2. In cross section the steam jackets 2 and 3 form an annular V-shaped chamber 13 for the reception of the mold shells 14 and 15. The mold shells 14 and 15 fit closely in the chamber 13, said shells meeting on a line 16 transverse to the axis and said shells forming a tire cavity 17. The cavity 17 has straight sides 18 and 19 and a semi-circular bottom 20.

The old tire casing 21 is provided with new rubber to form the retread 22. The inner tube 23 is inserted into the casing, the rim 24 is applied to the casing, the casing is placed in the cavity 17 and the inner tube inflated through the air valve 25. When the casing is ready for the mold, the shells 14 and 15 are applied to the casing, the steam jacket 3 is raised upon the hinge 4 and the casing and shells are placed in position in the steam jacket 2 and steam jacket 3 is swung downwardly to its closed position and the air supplied to the inner tube through the hose 26. A lug 27 extends downwardly from the lower end of the steam jacket 3. A screw threaded stud 28 is fixed in the base 1 so that when the steam jacket 3 is moved to a closed position, the stud 28 projects through the lug 27. Then a wing nut 29 is applied to the stud and tightened against the lug to hold the two jackets tightly together.

The mold shells 14 and 15 are complete circles and a pair of shells must be provided for each distinct size of casing. The chamber 13 should be made large enough for the largest size of mold shells, and then it is only necessary to have mold shells graduated downwardly from the largest size of casing to the smallest which it is desired to treat. Of course the mold shells will be thicker for the smaller casing than for the larger casing.

Thus I have produced a repair vulcanizer capable of curing a complete retread at one operation and capable of handling a variety of sizes of tire casings, simply by having a variety of interchangeable mold shells.

Especial attention is called to the fact that in retreading a tire casing with my repair vulcanizer and according to my process, the beads of the casing are not heated to injure the beads, and that it is a dry process, no steam coming in contact with the rubber.

I claim:

1. A repair vulcanizer comprising a base, a steam jacket rigid with the base and forming a part of a circle, a second steam jacket hinged to the first steam jacket and completing the circle, said steam jackets forming an internal annular V-shaped chamber, and mold shells adapted to fit in the chamber and receive a tire casing.

2. A repair vulcanizer comprising a base, a rigid steam jacket formed integral with the base and extending through substantially half a circle, a second steam jacket hinged at one end to one end of the first steam jacket and extending through the remainder of the circle; said steam jackets forming an internal annular V-shaped chamber; and mold shells fitting in the chamber and adapted to receive a tire casing.

3. A repair vulcanizer comprising a base, a rigid steam jacket formed integral with the base and extending through substantially half a circle, a second steam jacket hinged at one end to one end of the first steam jacket and extending through the remainder of the circle; said steam jackets forming an internal annular V-shaped chamber; and two mold shells fitting in the chamber and meeting on a line transverse to the axis and adapted to receive a tire casing.

In testimony whereof I have signed my name to this specification.

RUDOLPH P. ESPINOSA.